United States Patent [19]
Rye

[11] Patent Number: 4,952,754
[45] Date of Patent: Aug. 28, 1990

[54] VAPOR SEAL OUTLET BOX

[76] Inventor: Glen Rye, R.R. #2, Keswick, Ontario, Canada

[21] Appl. No.: 325,515

[22] Filed: Mar. 20, 1989

[30] Foreign Application Priority Data

Aug. 23, 1988 [CA] Canada .................................. 575478

[51] Int. Cl.⁵ .............................................. H02G 3/08
[52] U.S. Cl. ........................................ 174/53; 220/3.3
[58] Field of Search ............................ 174/48, 53, 58; 220/3.2, 3.3, 3.4, 3.5, 3.6

[56] References Cited

U.S. PATENT DOCUMENTS

| | | | |
|---|---|---|---|
| 4,626,617 | 12/1986 | Rye | 174/53 |
| 4,673,097 | 6/1987 | Schuldt | 220/3.3 X |
| 4,757,158 | 7/1988 | Lentz | 174/53 |
| 4,794,207 | 12/1988 | Norberg et al. | 174/53 X |

*Primary Examiner*—Leo P. Picard
*Assistant Examiner*—David A. Tone

[57] ABSTRACT

Electrical outlet box open side and edges of walls surrounding outer side cooperate with a ring member to seal to a flexible vapor barrier.

20 Claims, 6 Drawing Sheets

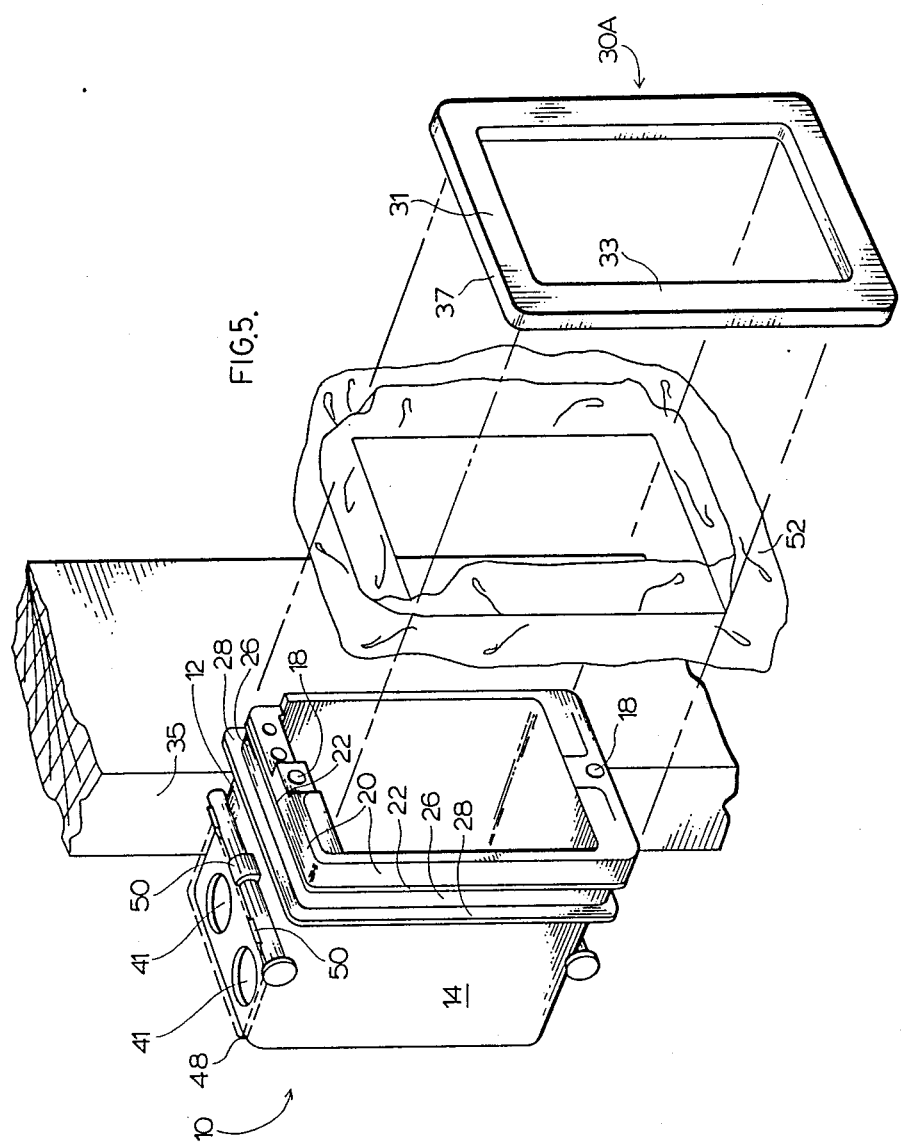

VAPOR SEAL OUTLET BOX

This invention relates to a unitary molded outlet box which is specifically designed for sealing to the flexible vapor barrier of a building whereby a vapor seal is provided which prevents the passage of air and vapor between the inside of the rooms of a house, and the portion of the house outside said rooms.

By the term 'electrical outlet box' herein, we refer to the box for mounting wall, ceiling or floor electrical receptacles, fixtures, lights, smoke detectors, television cable jacks or telephone outlet jacks and the like. Since the inventive outlet box is designed for cooperation with a flexible vapor barrier, it will customarily be used for locations on outside walls, ceilings or floors.

'Forward' and 'rearward' herein mean directions perpendicular to the room wall in which the receptacle or switch is to be used and refer to directions respectively into and out of said room.

In my U.S. Pat. No. 4,626,617 dated Dec. 2, 1986 and my Canadian Patent No. 1,187,590 dated May 21, 1985 both entitled: Container for Electrical Outlets, there is disclosed a container for an electrical outlet box having a ring which slides on the container to clamp a portion of the flexible seal to the side walls of the container for providing a seal therearound, acting with the container walls to prevent air and vapor passage through and around the outlet boxes. Such development was an improvement over the then prior method which was to wrap the electrical outlet box or receptacle with a plastic sheet and then drive nails and wires through it creating vapor leaks. The plastic sheet was then pulled through a hole in the vapor barrier and an attempt was made to tape the sheet to the flimsy flexible vapor barrier This method did not give a good seal against air and vapor passage inward and outward through and about the outlet and due to the manipulation and taping required was costly to the builders or contractor. My development as reflected in the before-mentioned U.S. and Canadian Patents was a considerable improvement over the then prior art but the requirement of an extra container has added substantially to the expense of this area of construction.

I have now developed a unitary molded outlet box, designed to receive a conventional receptacle or switch herein, having outwardly facing surfaces on the outside of its side walls extending within a small angle of the forward-rearward direction and a ring designed to slide over such surfaces and to clamp the flexible vapor barrier therebetween. The outlet box can therefore form a vapor seal directly with the vapor barrier. In effect, with this invention, the container of my prior patented development may be dispensed with since the seal is achieved with the outlet box itself. Other advantages are available with the new construction and with its alternatives as referred to thereafter in this introduction and in the description of the specific embodiment to follow.

In a preferred aspect of this invention the outlet box is also provided with means for closing the entrance through the walls of said outlet box about the electrical leads after insertion of such leads therethrough. Thus the outlet box in accord with the invention has four or more side walls and a rear wall. Usually two or more of such walls are provided with weakened areas or small openings which may be ruptured or widened to allow insertion of said leads therethrough. Preferably the box, corresponding to each of said weakened areas, is provided with an easily punctured slightly resilient pad, preferably of foamed neoprene overlying such weakened area which does not allow passage of air or water therethrough. When the leads are to be inserted through the box at the chosen weakened area, the leads are inserted through the pad piercing it, and the pad; and the pad, being somewhat resilient, tends to seal against the sides of the leads preventing (not perfectly but to a large degree) the passage of air into and out of the box about said leads. This is the action of the pad in two alternative arrangements of the outlet box. In one arrangement the unused weakened, potential connection area of the box is associated with entrance areas comprising small apertures in the box wall which are closed by the pad whether the connection is inserted therethrough or not. In the other arrangement at such entrance areas a thin web of the molded plastic closes the potential aperture at the weakened area. In accord with the invention a pad is located over either type of such entrance area, before use, to be punctured by and to seal about the electrical leads.

In a preferred aspect of the invention, the outlet box is provided with mounting means for nailing the outlet box to a wooden structural member and said mounting means is provided outside the box walls to define a path for such nails completely outside the box walls. Thus, since the nails do not pass through the box walls they do not form apertures in such walls where air or moisture could pass.

In a preferred aspect, the outlet box, with surfaces designed to receive an outer ring to clamp the vapor barrier film to the box side walls, is designed to provide an outwardly projecting spacer or equivalent spacing means on at least one of said walls rearward of the clamping area. The spacer is designed and dimensioned, if the spacer side of the box is moved against a wooden member for nailing, to ensure that a space exists between the outwardly facing wall surface and the wooden member to allow application of the ring to such surfaces without interference from such wooden member. Obviously such a spacer can be provided on as many walls of the box as will be found useful.

In a preferred aspect of the invention, the outlet box designed to receive an outer ring to clamp the vapor barrier thereto will be designed with the ring to receive the latter with a snap attachment so that the ring is securely positioned in place.

In a preferred aspect of the invention a unitary molded outlet box having back and side walls, designed to receive a conventional receptacle or switch therein, a ring member for application to the outside of said side walls adjacent their front edges, with the side walls and ring being provided with cooperating surfaces so that said ring may be pressed on and retained on said side walls with a snap action and with a flexible vapor barrier retained in place between said ring surfaces and said outlet box surfaces.

In drawings which illustrate a preferred embodiment of the invention.

Figure 1:
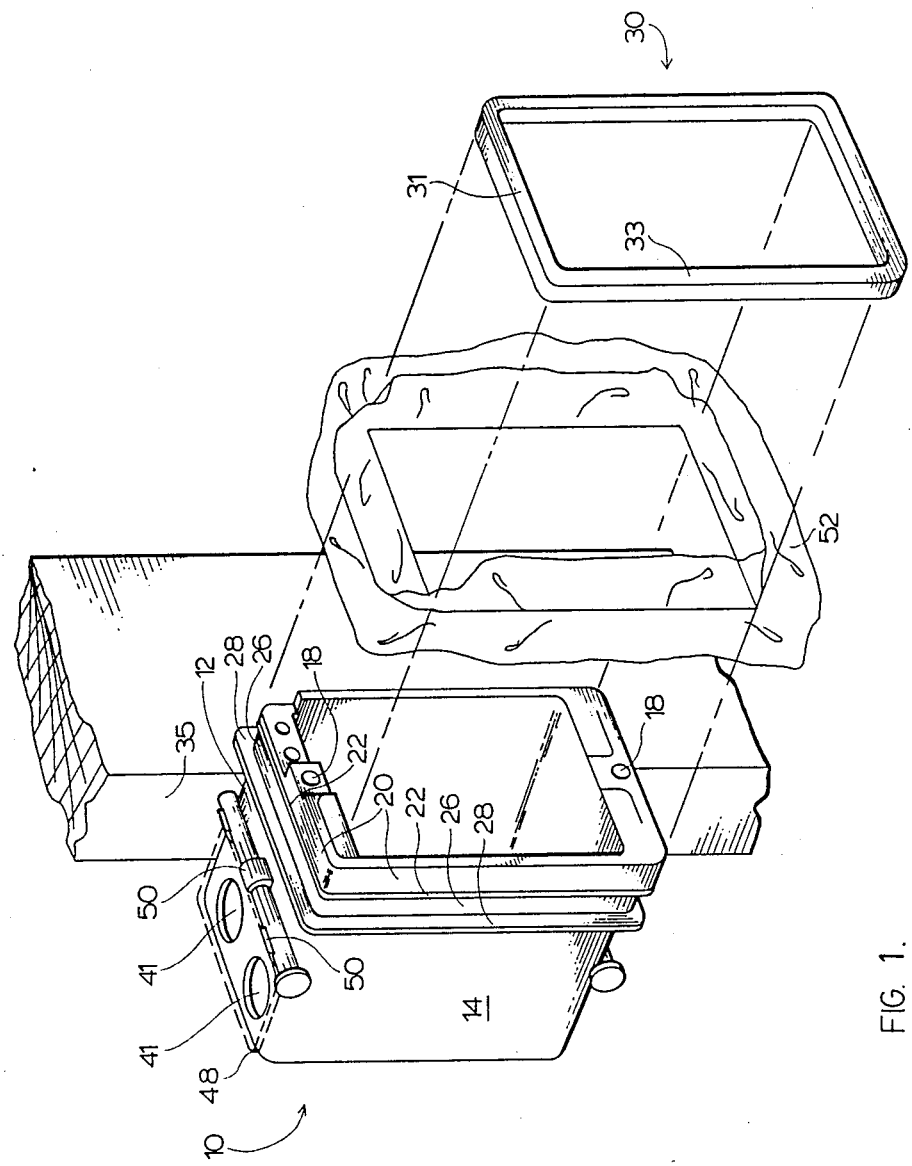
FIG. 1 is an exploded perspective view showing the outlet box mounted on a 2×4, the vapor seal and the ring.
Figure 2:
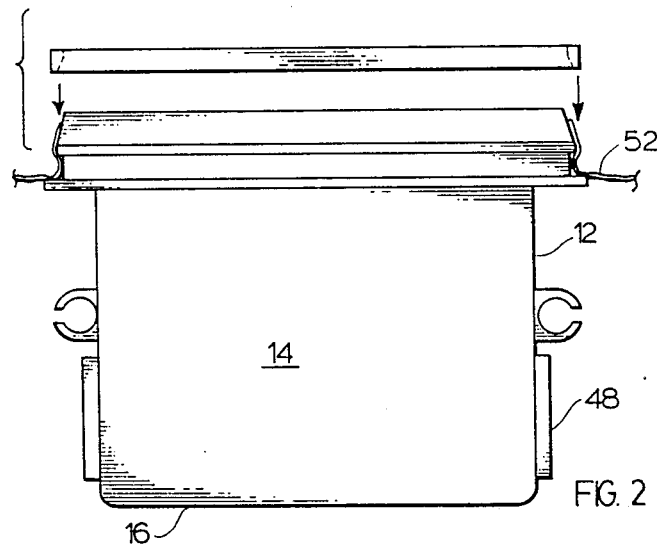
FIG. 2 is a side view of the box of FIG. 1.
Figure 3:
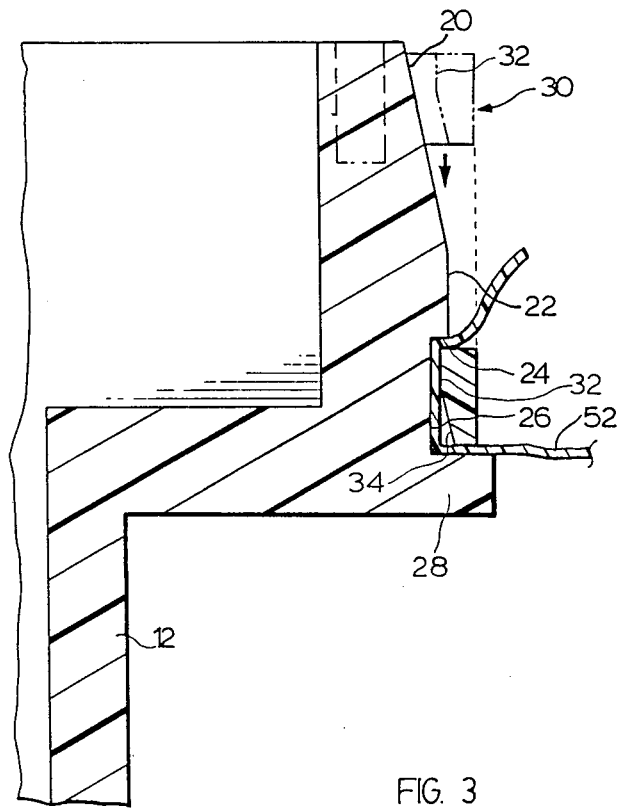
FIG. 3 is an enlargement in section of a portion of FIG. 2.
Figure 6:
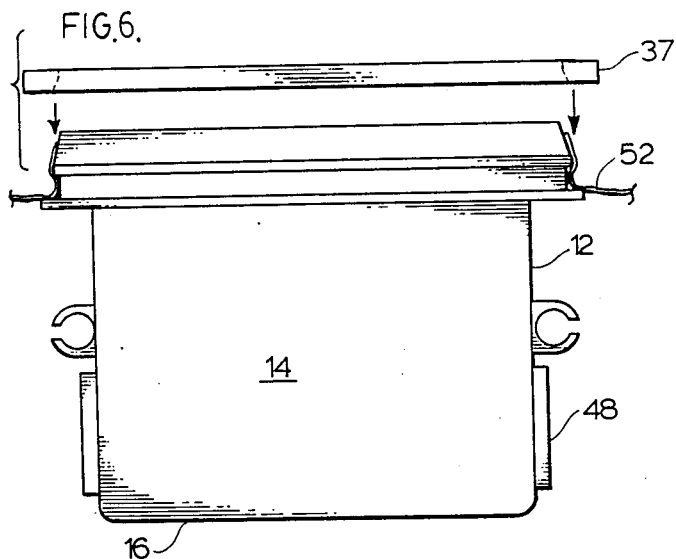
Figure 7:
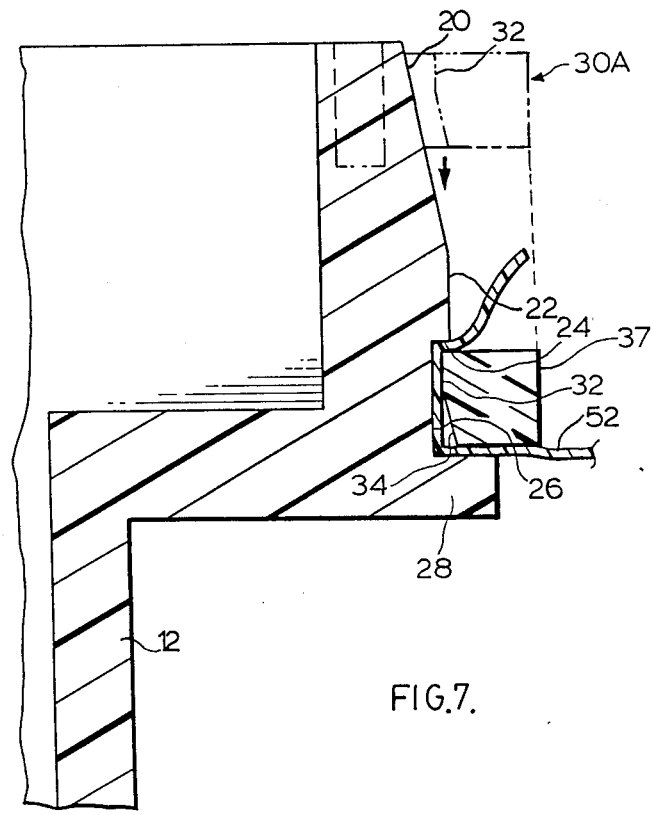

FIGS. 5, 6, and 7 correspond respectively to FIGS. 1, 2 and 3 but show a wider snap ring.

Figure 8:
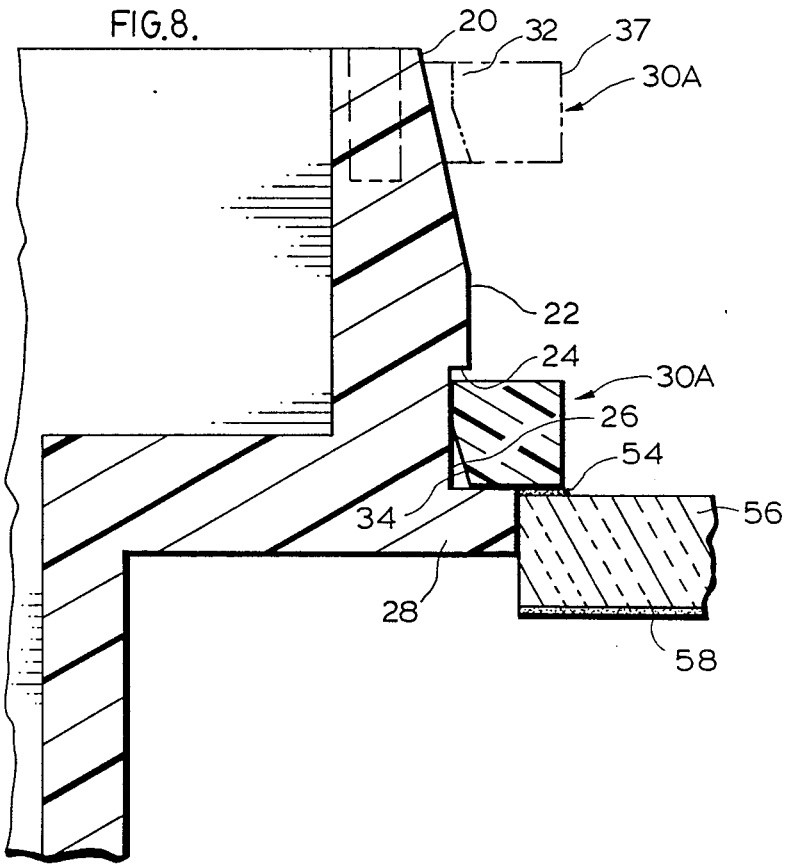

FIG. 8 shows an alternate use of the device of FIGS. 5–7.

In the drawings, an outlet box 10 of molded plastic is defined, having narrow side walls 12, wide side walls 14 and a rear wall 16. The box is open at the front for the receipt of a conventional receptacle, switch, fixture or the like (not shown) of the type usually mounted by two bolts in an outlet box in the threaded bores 18. Bores 18 are at the standard spacings for such bolts and the box is dimensioned to properly receive the receptacle or switch positioned by said bolts. Although a rectangular outlet box is shown, the invention is not so limited. The invention, for example, is equally applicable to outlet boxes having side and back walls, such as an octagonal box with eight side walls of (usually, approximately) equal dimension and a rear wall.

Returning to the specific embodiment, the opposed narrow side walls 12 are thickened in their forward portion and provided with threaded bores 18 at standard spacing to receive the bolts for mounting a receptacle, switch, or the like.

As shown in FIGS. 2 and 3 at the forward end, the narrow side walls are provided with outward facing outwardly and rearwardly sloping surfaces 20 terminating rearwardly in forwardly-rearwardly extending outwardly facing surfaces 22. Rearward of surface 22 the wall is stepped inwardly to form a rearwardly facing shoulder 24. Rearward of the shoulder is the forwardly-rearwardly extending outwardly facing surface 26 and rearward of this is the outwardly extending ridge 28. Rearwardly of ridge 28 wall 12 proceeds in a forward rearward direction preferably with a slight inward taper, not shown, for molding convenience, to meet rear wall 16.

In the preferred form of the invention shown, the surfaces 20, 22, 24, 26 and ridge 28 are extended along wide side walls 14 giving these members and walls the same section as that shown in FIGS. 2 and 3 for end walls 12.

A rectilinear ring 30 is provided to cooperate with members 20, 22, 24, 26, 28. The forward rearward dimension of the ring 30 is just less than the forward-rearward dimension between ridge 28 and the step 24. The sectional contour of the rectilinear ring is on each side as shown in FIGS. 2 and 3. Thus the ring is provided with inwardly facing, forwardly-rearwardly extending surfaces 32 dimensioned to make a sliding fit with surfaces 26. Rearwardly of surfaces 32 the inwardly facing surface 34 of the ring slopes rearwardly and outwardly at the same angle as that of surface 20 to allow the ring to be slid easily over surface 20.

It will be noted therefore that with the box installed, the vapor barrier 52 may be stretched thereover and cut out over the box opening to allow installation of the receptacle. The cutting of the vapor barrier to allow installation of the receptacle is performed to allow cut edge portions of the vapor barrier to extend in over the sides of the opening. The ring 30 may then be applied to box and snapped in place behind rearwardly facing shoulder 24 so that the inwardly extending edge portions of the vapor barrier are clamped in place between: shoulder 24 and the forward surface of the ring; between surface 26 of the wall and surface 32 of the ring; and between the forward side of ridge 28 and the rearward surface of the ring, all as shown in FIG. 3. It will be noted that both ring and box will customarily be made of molded plastic so that both members will have enough 'give' and resilience to allow the ring to be snapped into place.

It is within the scope of the invention to provide only the narrow side walls 12 and the short sides 31 of the ring with the sectional contour of FIG. 3, while the wider side wall 14 and the long side 33 of the ring are merely provided with complementary forwardly-rearwardly extending surfaces dimensioned to have a sliding fit. In this alternative the snap action holding the ring in place is performed on the short sides of the members while the long sides merely clamp the vapor barrier between their complementary surfaces.

Alternatively the long sides of the members may be provided with the sectional contours of FIG. 3 providing the snap action while the short sides merely have forwardly-rearwardly extending surfaces with a complementary sliding fit.

The invention also covers the alternative where all sides of the ring and the forward portions of walls 12 and 14 all merely have complementary forward-rearward sliding surfaces, there is no snap action and the ring, clamping the vapor barrier, is held in place by friction only.

The ridge 28 in the embodiment described has two purposes. It forms a rearward stop for the applicatory movement of the ring and it forms a spacer to maintain the forward surfaces 20 and 22 of the box sufficiently spaced from a member to which the box is attached (such as 2"×4" strut 25 of FIG. 1) to allow application of the ring on the strut side after the box has been hailed to the beam. It will be obvious that both functions of ridge 28 might be performed by one or two spaced protuberances. It is also within the scope of the invention to omit the ridge 28 or protuberances on sides of the box where the spacing function will not be required since the rearward stop is not essential.

Figure 2A:
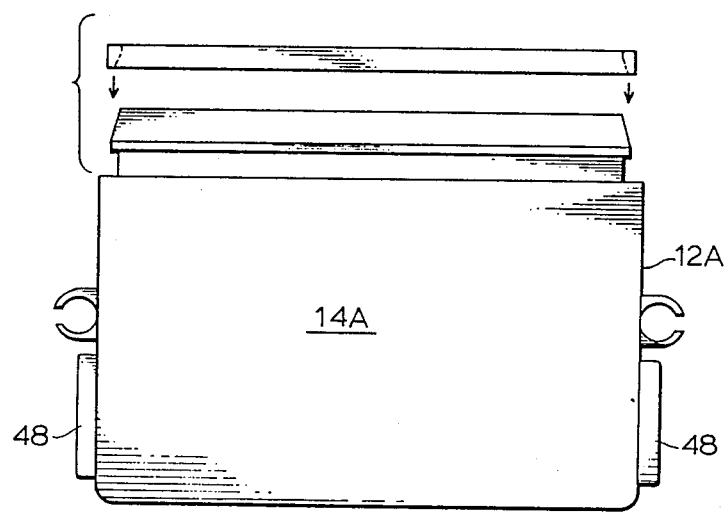
FIG. 2A illustrates an alternate shape for the device.

It is also within the scope of the invention to replace the ridge 28, on the sides where spacing is required, with a outwardly stepped wall 12A or 14A (as shown in FIG. 2A), so that the stepped out wall 12A or 14A forms its own spacer. However the molding of the stepped out arrangement of FIG. 2A is relatively difficult.

Figure 4:
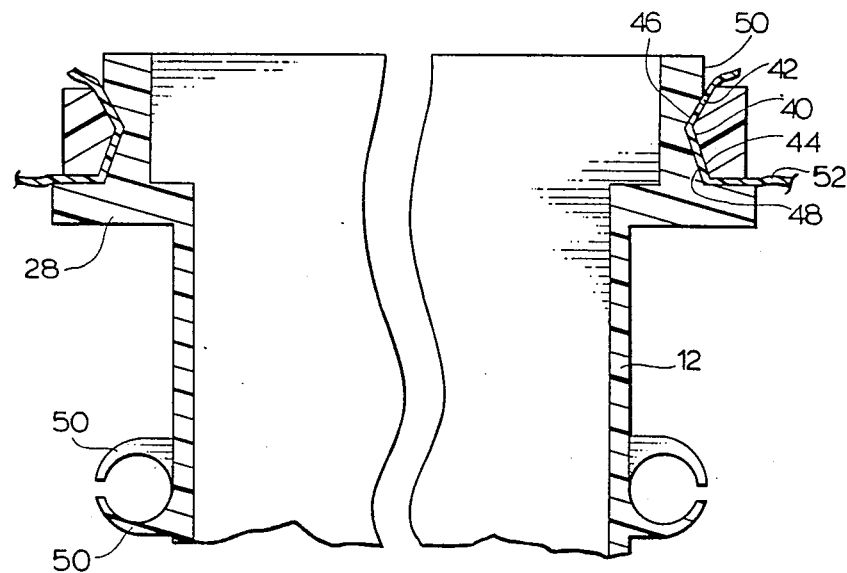
FIG. 4 shows an alternate snap connection for use with the invention.

FIG. 4 shows an alternative form for complementary outwardly facing surfaces for the outer forward box walls and the cooperating inner surface of the ring. As shown, the alternative form is to eliminate the forward-rearward sliding surfaces and instead provide the ring with an inward projection 40 defined by chamferred surfaces 42 and 44 and the box with complementary chamferred walls 46 and 48 suitably shaped to provide clamping of the vapor seal and a snap fit. It will be seen that wall 44 is dimensioned relatively to forward outwardly facing surface 50 of the box to assist the ring to be slid over the box into snap fit position. In addition to the alternative of reversing the complementary contours of FIG. 4 between box and ring, only two opposite sides of the box and ring may be provided with the arrangement of FIG. 4 and the other sides simply with forwardly-rearwardly extending surfaces.

On the rearward portion of the short side walls are weakened areas 41 which may be punctured or widened to allow insertion of electrical leads to the receptacle switch. The weakened areas may take several conventional forms all well known to those skilled in the art.

Such forms include: a simple weakened area, a deflectable tab surrounded by a small clearance or such a tab surrounded by a thin membrane to close the area. All are within the scope of the invention. Those areas which will or might be used are covered by a puncturable slightly resilient plastic pad 48.

It is preferred to use, as the pad material, foamed neoprene of the type without interconnected cells to provide a vapor and liquid barrier over each weakened area. If the weakened area 41 is of the type which has openings even before use then the invention provides for a pad 48 over each one. On the other hand if the weakened area is closed until use it is only necessary to have the pad over those weakened areas which will be used on a particular installation.

In operation, the leads are led through the pad 48, rupturing it and the weakened area selected for connection to the outlet. The pad 48 then, due to its resilience tends to move against the sides of the leads closing the space about the lead, not perfectly but to a large degree against air flow therethrough.

At each narrow side wall of the box a plurality of hook members 50 are provided, designed to define in side view a path for nails for attaching the box to a stud 35. It will be noted that the effect of the hooks is to define a nail path and, once a nail is inserted along the path designed by the hooks and hammered into the stud 35, fixes the box in location. The hook members 50 may be of any form suitable for this function or may be rings defining an aperture or a weakened area for the passage of the nails. The important feature from the point of view of the invention is that such mounting hooks or rings are molded completely outside the walls 12 or 14 and define a nailing path whereby the nails do not rupture the walls. This is in distinction to prior box designs where the nail mounting passages extend through the outlet box itself.

In operation with the invention, the box 10 is first mounted in place usually to a wooden stud 35 and usually using the nailing attachment means provided. Secondly the leads are then led through the appropriate pad 48 and weakened area 41 (obviously these two steps may be reversed). The vapor barrier 52 is then laid over the box and cut over the box opening. The ring is then snapped or moved into place to clamp the vapor barrier on all sides of the box to the box to the box wall. The receptacle may then be connected to the leads and fastened to the box, leads clamped in place and ground connected all in manners well known to those skilled in the art. The spacing means (ridge 28 of FIGS. 1, 2, 3, 4 or the stepped out wall of FIG. 2A) has spaced the forward portion of the relevant side of the box from stud 35, sufficiently that the ring may be applied between box and stud.

The vapor seal thus formed at the outlet is made by the seal of the vapor barrier between ring and box, by the box side and bottom walls and by the pad 48 biassed against the leads.

The application does not describe grounding and clamping means for the box and other conventional components and features including means for attachment of the cover plate, all well known to those skilled in the art.

As stated in the introduction the invention applies to an open fronted box for telephone outlet jacks or TV outlet jacks as well electrical outlets and switches. In all such applications an open fronted box in accord with the invention may be provided with the sealing ring for clamping the vapor barrier to the box.

FIGS. 5, 6, and 7 correspond respectively to FIGS. 1, 2, and 3 and all parts are identical with identical functions. The ring 30A of FIGS. 5-7 replaces ring 30 and the ring 30A is identical in operation but is made considerably wider so that, when snapped in place below surface 22 to hold vapour barrier 52 in place the outer surface 37 of the ring 30A extends outwardly beyond the outward surface of ridge 28. Such outward extension occurs on both sides and both ends of the box and makes the outer surface 37 of the ring outward of any portion of the outlet box. The purpose of the wider ring 30A is to protect the vapor barrier from accidental damage in case a workman (for example cutting a hole in dry wall, uses the outer side of the box as a guide for his saw. In such case the outwardly extending portion of ring 30 will block the saw's path to the vapor barrier. In this alternative the ridge 28 will no longer provide spacing of the box from a 2×4 for the ring but in this alternative such spacing is not needed because the widened ring could sit in front of the 2×4.

FIG. 8 shows the widened ring construction used with the different kind of vapor barrier 58 laminated on drywall 56. In such case the ring 30A cannot clamp the drywall but seals against the outer surface of the drywall 56 and for this purpose is provided with a compressible foam backing 54.

I claim:

1. Electrical outlet box in combination with a vapor barrier of flexible material, comprising:
    a unitary molded outlet box having side walls and a front opening, said outlet box being designed to receive and mount a conventional receptacle or switch therein,
    the side walls, adjacent their forward edges defining outwardly facing surfaces extending within a small angle of the forward-rearward direction which together substantially surround the front opening,
    a ring member having surfaces designed to be complementary to and to slide upon said side wall surfaces,
    a flexible vapor barrier retained in place between said ring surfaces and said outwardly facing surfaces.

2. Electrical outlet box as claimed in claim 1 including lead entrance areas in the walls of said box, and means for substantially sealing the electrical leads after insertion of such leads through a lead entrance area.

3. Electrical outlet box as claimed in claim 2 including a foamed plastic seal for overlying said lead entrance areas, said foamed plastic seal being designed to be punctured by the insertion of an electrical lead therethrough and through an entrance area and to tend to seal about the lead after insertion.

4. Electrical outlet box as claimed in claim 3 wherein mounting means for nailing said box to a wooden structural member are molded on the outside of a wall of said outlet box, defining paths for such nails completely outside said box walls.

5. Electrical outlet box as claimed in claim 3 wherein at least one side wall of said box, rearward of said surfaces, provides means extending outwardly of said surfaces to form a spacer from a mounting member whereby, when said outlet box is mounted, with said one side wall facing said mounting member, said spacer allows the location of said ring member over said side wall surfaces including an extent between said one side wall and said mounting member.

6. Electrical outlet box as claimed in claim 3 wherein means are provided on opposed side walls and on said ring cooperatively shaped to allow said ring to be slid inwardly over said surface with a snap attachment and with said flexible seal clamped between said ring and said box.

7. Electrical outlet box as claimed in claim 2 wherein mounting means for nailing said box to a wooden structural member are molded on the outside of a wall of said outlet box, defining paths for such nails completely outside said box walls.

8. Electrical outlet box as claimed in claim 2 wherein at least one side wall of said box, rearward of said surfaces, provides means extending outwardly of said surfaces to form a spacer from a mounting member whereby, when said outlet box is mounted, with said one side wall facing said mounting member, said spacer allows the location of said ring member over said side wall surfaces including an extent between said one side wall and said mounting member.

9. Electrical outlet box as claimed in claim 2 wherein means are provided on opposed side walls and on said ring cooperatively shaped to allow said ring to be slid inwardly over said surface with a snap attachment and with said flexible seal clamped between said ring and said box.

10. Electrical outlet box as claimed in claim 9 wherein said ring member extends outwardly from said complementary surfaces to an outer surface outward of any portion of the outlet box.

11. Electrical outlet box as claimed in claim 1 including lead entrance areas in the walls of said outlet box, a foamed plastic seal overlying said lead entrance areas, said foamed plastic seal being designed to be punctured by the insertion of an electrical lead therethrough and through an entrance area and to tend to seal about the lead after insertion.

12. Electrical outlet box as claimed in claim 11 wherein mounting means for nailing said box to a wooden structural member are molded on the outside of a wall of said outlet box, defining paths for such nails completely outside said box walls.

13. Electrical outlet box as claimed in claim 11 wherein at least one side wall of said box, rearward of said surfaces, provides means extending outwardly of said surfaces to form a spacer from a mounting member whereby, when said outlet box is mounted, with said one side wall facing said mounting member, said spacer allows the location of said ring member over said side wall surfaces including an extent between said one side wall and said mounting member.

14. Electrical outlet box as claimed in claim 11 wherein means are provided on opposed side walls and on said ring cooperatively shaped to allow said ring to be slid inwardly over said surface with a snap attachment and with said flexible seal clamped between said ring and said box.

15. Electrical outlet box as claimed in claim 1 wherein mounting means for nailing said box to a wooden structural member are molded on the outside of a wall of said outlet box, defining paths for such nails completely outside said box walls.

16. Electrical outlet box as claimed in claim 1 wherein at least one side wall of said box, rearward of said surfaces, provides means extending outwardly of said surfaces to form a spacer from a mounting member, whereby, when said outlet box is mounted, with said one side wall facing said mounting member, said spacer allows the location of said ring member over said side wall surfaces including an extent between said one side wall and said mounting member.

17. Electrical outlet box as claimed in claim 1 wherein means are provided on opposed side walls and on said ring cooperatively shaped to allow said ring to be slid inwardly over said surface with a snap attachment and with said flexible seal clamped between said ring and said box.

18. Electrical outlet box as claimed in claim 17 wherein said ring member extends outwardly from said complementary surfaces to an outer surface outward of any portion of the outlet box.

19. Electrical outlet box as claimed in claim 1 wherein said ring member extends outwardly from said complementary surfaces to an outer surface outward of any portion of the outlet box.

20. Electrical outlet box in combination with a vapor barrier of flexible material, comprising:
- a unitary molded outlet box having side and rear walls and a front opening, said outlet box being designed to receive and mount a conventional receptacle or switch therein,
- a ring member for application to the outside of said side walls adjacent their front edges,
- said side walls and said ring being provided with cooperating surfaces so that said ring may be pressed onto and retained on said side walls by a snap action,
- a flexible vapor barrier retained in place between said ring surfaces and said side wall surfaces.

* * * * *